United States Patent
Vaidyanathan et al.

(10) Patent No.: US 6,935,594 B1
(45) Date of Patent: Aug. 30, 2005

(54) COMPOSITE COMPONENTS WITH INTEGRAL PROTECTIVE CASINGS

(75) Inventors: K. Ranji Vaidyanathan, Tucson, AZ (US); Catherine Green, Tucson, AZ (US); John W. Gillespie, Hockessin, DE (US); Shridhar Yarlagadda, Newark, DE (US); Gregory J. Artz, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 10/293,852

(22) Filed: Nov. 12, 2002

Related U.S. Application Data

(60) Provisional application No. 60/344,936, filed on Nov. 9, 2001.

(51) Int. Cl.[7] .................................. B64C 1/00
(52) U.S. Cl. ................ 244/121; 428/113; 244/133; 501/32
(58) Field of Search ............................ 244/117 R, 119, 244/121, 133; 343/189; 428/113, 301.4, 428/293.4; 501/32, 88; 427/387, 508; 342/1

(56) References Cited

U.S. PATENT DOCUMENTS

| | | | |
|---|---|---|---|
| 3,721,982 A | * 3/1973 | Wesch | 343/18 A |
| 4,885,199 A | * 12/1989 | Corbin et al. | 428/113 |
| 5,318,930 A | * 6/1994 | Leung et al. | 501/32 |
| 5,558,932 A | * 9/1996 | Scanlon | 442/277 |
| 5,612,399 A | * 3/1997 | Beckley et al. | 501/88 |
| 5,824,404 A | * 10/1998 | Brown et al. | 428/301.4 |
| 6,048,488 A | 4/2000 | Fink et al. | |
| 6,221,921 B1 | 4/2001 | Lombardi et al. | |
| 6,314,720 B1 | 11/2001 | Holmes et al. | |
| 6,442,931 B1 | 9/2002 | Vasin et al. | |
| 6,460,807 B1 | 10/2002 | Braitinger et al. | |
| 6,537,654 B1 | * 3/2003 | Gruber et al. | 89/36.02 |
| 6,551,663 B1 | * 4/2003 | Kirby et al. | 427/508 |

* cited by examiner

*Primary Examiner*—Galen Barefoot
(74) *Attorney, Agent, or Firm*—Banner & Witcoff, Ltd.

(57) ABSTRACT

Methods and compositions for fabricating composite parts including at least one structural material and at least one protective material that are integrally bonded without the use of secondary bonding operations. One or more of the materials forming the layers of the composite parts may be a ceramic composition with or without porosity and one or more of the materials may be a polymer composition. Methods including co-injection processes also are provided for fabricating multi-layered structures in which each layer serves a desired function while still being integrated into the overall structure.

20 Claims, 3 Drawing Sheets

COMPOSITE COMPONENTS WITH INTEGRAL PROTECTIVE CASINGS

CROSS REFERENCE TO RELATED APPLICATIONS

This application is based on, and claims the benefit of, co-pending U.S. Provisional Application Ser. No. 60/344,936, filed on Nov. 9, 2001, entitled "Composite Casings with Integral Heating Shields," and incorporated herein by reference.

The present invention was made with U.S. Government support under SBIR Grants #F04611-01-C-0058 and DASG60-02-P-0234 awarded by the Air Force and the Army, respectively. Accordingly, the U.S. Government may have certain rights in the invention described herein.

FIELD OF THE INVENTION

The present invention relates to structural composite components. More particularly, this invention relates to lightweight ceramic structures having integral insulating layers for thermal protection in high temperature applications, such as in turbo-machinery parts and missile propulsion systems.

BACKGROUND OF THE INVENTION

Rockets, missiles and other similar airborne structures that move through the air at very high speeds are subject to harsh environmental conditions during use. The component structures must be designed to withstand high temperatures and pressures that are experienced as the structures move through the air. Surface temperatures of 1500° C. or greater may be encountered as a result of aerodynamic heating. When the structures are self-propelled and include engines that burn solid or liquid fuel, the engines components and adjacent components are subject to even greater temperatures as a result of the burning fuel. The components of such airborne structures must be fabricated of materials having sufficient strength to maintain their structural integrity during flight so as to not compromise the performance of the structure.

Metals and metal alloys have been utilized for their structural strength and ability to withstand elevated temperatures. These materials can be used to fabricate various components or portions of components to impart the desired properties to the component. For example, U.S. Pat. No. 6,314,720 discloses a protective coating for the combustion chamber of a liquid-fueled rocket engine that includes a liner fabricated of a variety of metallic materials. U.S. Pat. No. 6,442,931 discloses a combustion chamber that includes a steel or nickel alloy casing, a copper or copper alloy internal firewall, and an internal nickel coating. Weight restrictions and cost concerns for such airborne structures, however, limit the feasibility of using materials such as metals and metal alloys.

Polymer composites are another option for materials selection that presents various advantages. For example, the high stiffness of polymer composites provides a rigid structure. Further, polymer composites have low densities, so that components fabricated of these materials are of lighter weight and well within applicable weight limits.

Although use of polymer composites for airborne structures can provide many advantages, material properties of such composites may restrict the use of polymer composites alone in high temperature and/or high-pressure applications. Significantly, polymer composites are not fire resistant, and a thermally resistant material must be used in connection with polymer coating so that the polymer composite does not soften or ignite during use. Additionally, the strength of the polymer composite alone often is not sufficient to withstand typical forces associated with missile systems and the like.

With rocket motor casings, polymer composites have been used in combination with a separate thermally protective material to shield the polymer composites from exposure to the harsh conditions encountered by the components. Thermally protective materials are bonded to the airframe in secondary manufacturing operations. These post-bonded heat shields are often damaged during handling, and are rendered susceptible to debonding and moisture degradation over time. As a result, the damaged heat shields typically must be repaired frequently over the life of the component, which is not only inefficient but costly, as well.

Ceramics also have been used to fabricate components of airborne structures. U.S. Pat. No. 6,460,807 discloses carbon fiber-reinforced carbon, carbon fiber-reinforced silicon carbide, and silicon carbide fiber-reinforced silicon carbide components. Hybrid components formed by mechanical treatment of blanks and sub-segments also are disclosed. As with other mechanically formed components, a strong likelihood exists for the layers of such hybrid structures to delaminate during use as a result of the extreme temperature and pressure conditions, particularly in combustive environments.

There remains a need for an integrally fabricated composite structure to provide a material system having sufficient strength, fire resistance and durability characteristics to withstand use in airborne structures and high temperature and pressure applications. Such a composite structure would avoid a need for secondary manufacturing operations, such as bonding operations, to minimize maintenance costs associated with the repair of debonded and damaged components over the life cycle of the component.

SUMMARY OF THE INVENTION

The present invention is directed to a durable composite structure that is lightweight and capable of withstanding elevated temperatures and/or pressures. More specifically, the present invention relates to methods and compositions for fabricating multiple layer composite parts that avoid the need for secondary manufacturing operations, including bonding operations, and structural defects associated with parts assembled by such operations. Two or more compositions may be molded and co-cured to provide a multiple layer composite component having integrally formed, securely bonded layers that generally will not be subject to delamination.

In one aspect, at least one of the layers includes a polymer composition. The polymer composition provides a durable, lightweight support structure for the composite part. The polymer composition may be selected from aerospace-grade epoxies or other suitable epoxies, such as fiberglass and vinyl ester. Fibrous material may be included in the composition to enhance the strength and fracture toughness of the resulting layer.

The composite part also includes a protective layer for surfaces of the polymer composition layer that may be exposed to elevated temperatures. The layer is disposed between the exposed surface and the deteriorative environment and is selected to be effective for shielding the structural support layer from the detrimental effects of heat and fire. The insulating layer may include ceramic compositions and preferably may have thermal conductivities of up to about 10 watts per meter-Kelvin (W/m-K) and more preferably no more than about 3 W/m-K. Suitable compositions include $Si_3N_4$, SiC, ZrC, Si—O—N (sialons), magnesium aluminosilicate (cordierite), fused silica and mixtures thereof. The ceramic composition may be a green ceramic, at least partially sintered, or fully sintered. Fibrous material may be included in the composition to enhance the fracture toughness and insulating effect of the ceramic composition. The ceramic composition layer also may have a predetermined porosity to provide an increased insulating effect. Preferably, the porosity of the layer may be at least about 20 percent by volume and the pores may be internally disposed in the layer with diameters of between about 50 to about 100 $\mu$m. The insulating layer may provide protection against temperatures of at least about 1200° C. and even as great as 3500° C. or higher. The insulating layer also may provide a barrier that limits moisture migration.

In another aspect, a ceramic composition may be used in place of the polymer composition to provide structural support. The ceramic composition is selected to be lightweight and have sufficient strength and fracture toughness. The ceramic compositions preferably may have thermal conductivities of up to about 10 W/m-K and more preferably no more than about 3 W/m-K. Suitable compositions include $Si_3N_4$, SiC, ZrC, Si—O—N (sialons), magnesium aluminosilicate (cordierite), fused silica and mixtures thereof. The ceramic composition may be a green ceramic or may be at least partially sintered. Fibrous material may be included in the composition to enhance the fracture toughness and insulating effect of the ceramic composition.

In yet another aspect of the invention, the composite parts may be used in missile systems, space systems and other airborne assemblies. By way of example, the composite parts may be used to form parts that experience elevated temperatures during flight and reentry, including rocket motor casings, missile casings, low erosion insulators, nozzles, thrusters, noses, fins, leading and trailing edges and the like. Further, the composite part may be suited for radar absorption. A ceramic composition may be selected to have a dielectric constant and loss tangent sufficient for radar absorption.

The present invention is also directed to methods for fabricating composite structures. Such methods may include any known injection molding method adapted for co-injection of two or more compositions to provide a multiple layer structure. In one aspect, two or more compositions are injected into a mold. The compositions are injected into adjacent portions of the mold but are maintained generally separate during injection. The compositions form separate, adjoining layers that, upon curing, are integrally formed with one another. The compositions may be injected either simultaneously or sequentially as long as the layers are co-cured to provide secure bonding of the layers.

One or more of the layers formed may provide structural support for the composite part, and one or more of the layers formed may provide protection for the structural layer against deteriorative environmental conditions such as elevated temperatures and pressures and fire. The structural support layer is formed of a thickness and density effective for providing support for and maintaining the structural integrity of the composite component. The protective layer is formed with a predetermined thickness effective for limiting the transfer of heat through the thickness of the layer. The protective layer also may include a predetermined degree of porosity to enhance its heat insulating effects.

In another aspect, a separation layer may be provided in the mold to limit mixing of the compositions prior to curing. Such a separation layer may be positioned at the interface of two layers. The separation layer is selected to be compatible with the slurry compositions and either permeable or impermeable to those compositions. The separation layer may be a thermoplastic polymer film, a thermoset film adhesive, or combinations thereof.

DETAILED DESCRIPTION OF THE INVENTION

The present invention relates to integrally co-cured composite components that provide multiple functionalities, including structural support, thermal insulation, and moisture resistance. The combination of the multiple layers of the components renders a unique synergy, making them particularly suited for use in applications in which weight of the overall structure is a concern and in which extreme environmental conditions may be encountered. More particularly, the composite components include two or more layers that are co-cured so as to be integrally bonded thereby avoiding the need for secondary bonding operations. The compositions of the layers are selected to provide generally a lightweight yet durable support matrix, as well as to provide protection from damaging environmental conditions, such as elevated temperatures and pressures, fire and moisture, that may be experienced. Methods of fabricating such components also are provided.

Figure 1:
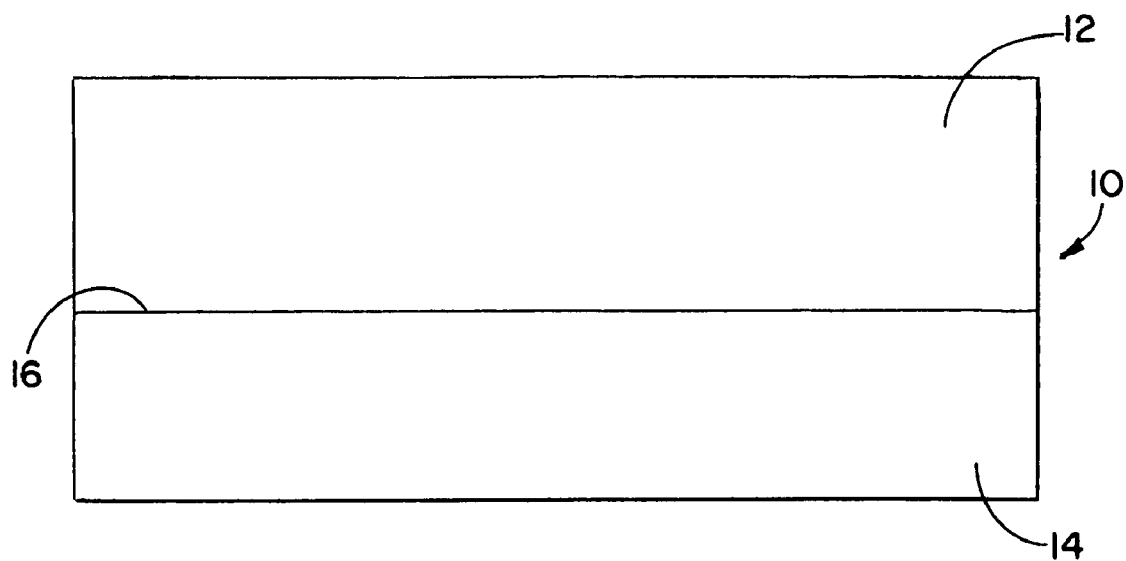
FIG. 1 is a cross-sectional view of a composite part in accordance with the present invention.

Composite components in accordance with the present invention have multiple layers selected from polymer compositions, ceramic compositions, and the like. Referring now to FIG. 1, there is illustrated a two-layer composite component 10. At least one layer 12 is selected as a support matrix for the composite component, and at least one layer 14 is selected as a protective casing. The protective casing preferably is disposed between the support matrix, or other relatively less durable structure or material, and the degenerative atmosphere, whether such conditions are internally or externally located, so as to provide a shield or barrier between the atmosphere and the relatively less durable structure or material. The integral fabrication of the components of the present invention eliminates the need for secondary bonding operations. The components have enhanced performance characteristics and are fabricated by a more cost-effective process as compared to parts fabricated using traditional secondary bonding procedures.

The support matrix layer preferably will be denser with limited to no porosity to provide enhanced rigidity for the component part. In comparison, the protective casing preferably will be less dense with a higher porosity to enhance the insulating properties of the layer. The porosity of the protective casing layer may be at least about 20 percent by volume and more preferably between about 20 to about 60 percent by volume. The degree of porosity also may be selected to reduce the weight of the composite component, as well as to reduce the thermal conductivity of the layer. The pores preferably are disposed internally in the material and have diameters of between about 50 to about 100 $\mu$m. Preferably, the internal pores are generally uniform in shape and size. A porous macrostructure can be fabricated in the protective layer using any suitable technique known to those of skill in the art. By way of example, porosity can be imparted by mixing a foaming agent and/or microballoons in the slurry composition prior to injection into the mold. As another example, an inert gas can be mixed with the slurry.

The material compositions used to form the layers may include polymer compositions, ceramic compositions and mixtures thereof. Polymer compositions include fiberglass, vinyl ester, and aerospace grade epoxy resins, including SC11 and SC15, both commercially available from Applied Poleramic Inc., Benicia, Calif., Fiberite 977-3, Cycom 8515 and Cycom 890, all commercially available from Cytec Industries, New Jersey, Vantico Epibond 1534 A/B and Vantico Epocast 50A/496, both commercially available from Vantico Inc., New York, and Hysol EA 9396 commercially available from Loctite Corp., California. Ceramic compositions include $Si_3N_4$, SiC, ZrC, Si—O—N (Sialons), magnesium aluminosilicate (Cordierite), fused silica or any other suitable ceramic composition having a thermal conductivity of up to about 10 W/m-K and more preferably no more than about 3 W/m-K. Preferably, the ceramic slurries have high ceramic loadings to limit shrinkage and possible distortion of the ceramic part during drying. Preferably, the slurries have at least about 50% ceramic powder by volume.

Various ceramic slurries using a non-aqueous binder system may be used in preparing the composite casings of the present invention. The ceramic powders used to prepare the slurries may be combined with sintering aids and other additives as desired. The solids volume loading of the slurries preferably is between about 40% to about 60%. In another embodiment, the dielectric constant of the ceramic material can be tailored for radar absorption. The slurry may include components to provide a ceramic composition having a desired radar absorption. As an example, such a slurry includes a $Si_3N_4$—AlN—$Al_2O_3$ formulation at about 50% volume solids loading.

Non-aqueous siliceous particulate slurries such as described in U.S. Pat. No. 6,221,921, incorporated herein by reference, may be used in forming the layers of the components. Very briefly, a gel-casting process includes milling a ceramic material, such as $Si_3N_4$, SiC, and ZrC, with a non-aqueous carrier. A gelling agent is mixed with the slurry. The slurry is deposited in a mold and heated to a temperature sufficient for gelling the slurry and forming a green ceramic part. Green part consolidation depends at least in part on slurry gelation mechanisms. While not wishing to be bound by any theories, gelation may be accomplished in one aspect by in situ free radical polmerization of acrylate or vinyl monomers present as solutes within the gel-casting slurry vehicle. The resulting polymer forms a binder phase in the gel-cast ceramic part after molding.

Figure 2:
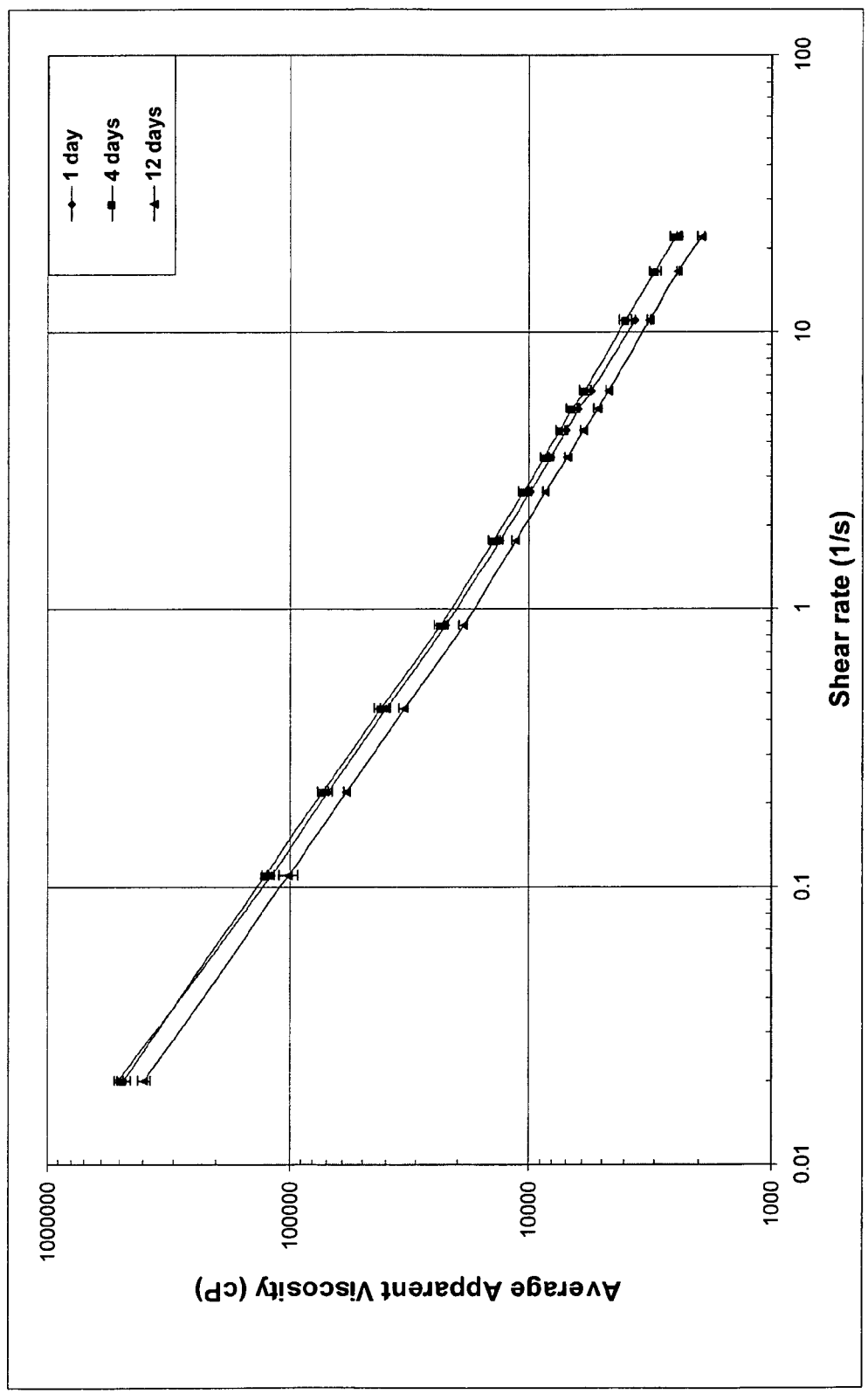
FIG. 2 is a graphical illustration of a silicon nitride ceramic slurry in accordance with the present invention formulated in a non-aqueous vehicle and aged for various lengths of time.

The advantages associated with the gel casting slurries are numerous. The gel-casting slurry solidifies with very little shrinkage at temperatures close to polymer composite processing temperatures. The slurries have very low viscosities allowing them to be injected into a mold using conventional RTM or VARTM processes if desired for low-cost manufacturing. A viscosity plot for a typical silicon nitride ceramic slurry is shown in FIG. 2. They have long shelf lives that enable them to be stored at ambient conditions. The gel casting slurry can be injected into complicated shaped molds and can produce final components with good surface finish. After curing, the layers are essentially fully dense and also can act as a moisture barrier to the rocket motor shell inside.

In another embodiment of the present invention, one or more of the layers includes a reinforcement material. The reinforcement material can be a fiber material such as glass, graphite, Kevlar and mixtures thereof. The reinforcement material can be in the form of a chopped or woven mat, continuous fiber form or other suitable arrangement that is selected to enhance structural integrity while also having a desired permeability to allow a predetermined amount of material flow therethrough during injection processes. Preferably, the fiber preform has a porosity of at least about 20% and more preferably between about 40 to about 50% by volume to enable effective infusion of the epoxies and slurries. Layers formed using a fiber preform have relatively higher fracture toughness as compared to layers without any reinforcement material.

In another embodiment, a separation layer 16 (FIG. 1) may be provided in the mold to limit mixing of the epoxy and ceramic slurry compositions prior to curing. Such a separation layer may be positioned at the interface of two layers. The separation layer is selected to be compatible with the epoxy and ceramic slurry compositions and is either permeable or impermeable to those compositions. Preferably, the separation layer is permeable to the epoxy and ceramic slurry compositions to promote chemical and mechanical bonding between the layers. The separation layer may be a thermoplastic polymer film, a thermoset film adhesive, or combinations thereof.

In other embodiments of the present invention, there also are provided integrally co-cured heat shields for rocket motor casing and the like. The composite parts, which include two or more layers of ceramic and epoxy compositions, possess enhanced structural integrity and ablation characteristics. The outer surface layer of the components includes an epoxy mixed with high thermal conductivity reinforcement material such as graphite to provide the desired surface finish and render the material compatible with processing temperatures. The epoxy compositions also provide the high dynamic structural strength required for rocket motor casings. Delamination at the interface of the layers, which is associated with conventional fabrication methods involving secondary bonding of a heat shield to a casing, is avoided with integrally co-cured heat shields. The ceramic shell and/or liner can also act as a moisture barrier for the epoxy inner layer. As a result, the rocket motor casing may be stored for longer periods, such as those required under actual service. Moreover, the composite structures of the present invention will not increase the weight of the rocket motor casing because the ceramic material remains in the cured (green) state and, therefore, the density of the material is close to that of the epoxy composition.

In accordance with the methods of the present invention, composite components are fabricated using resin transfer molding or resin infusion processes or other modified molding processes known to those of skill in the art that allow co-curing of the various layers of the component. The multiple layers of the component, which may be formed by simultaneous or concurrent injection of the material compositions, are cured concurrently so that the resulting layers are integrally bonded. The use of known composite manufacturing techniques such as filament winding and resin transfer molding (RTM) make the fabrication of composite components more affordable and manufacturable. For room temperature resin infusion processes, epoxy varieties such as SC11 and SC15 or vinyl esters with room temperature viscosities in the range of about 100 to about 400 cP are preferred. For elevated temperature resin infusion or resin transfer molding process, other epoxy varieties may be suitable. With these processes, resin infusion for the structural layer and for the insulating layers is performed sequentially, because processing temperature requirements for the two layers may not be the same or similar.

Figure 4:
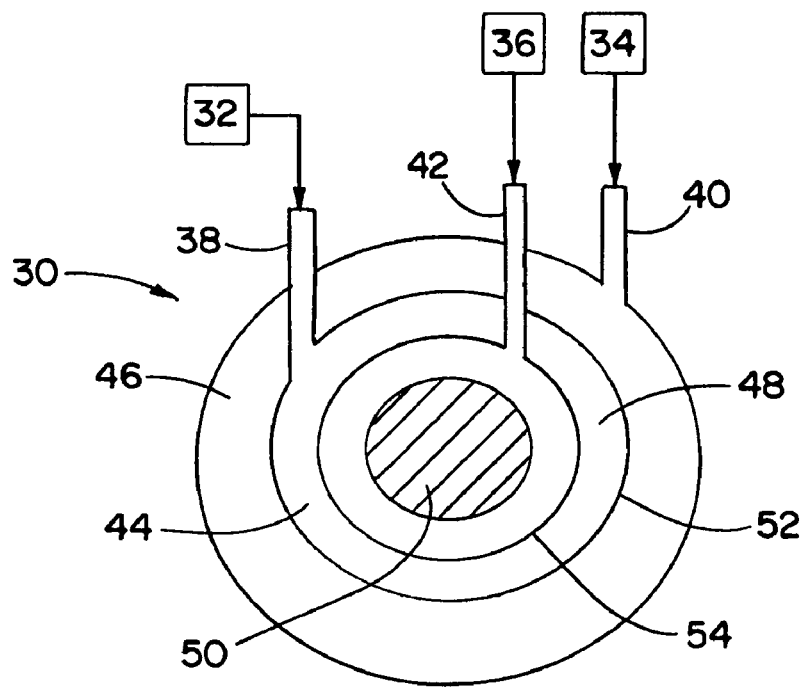
FIG. 4 is a cross-sectional view of a composite casing in accordance with the present invention, illustrating a portion of an assembly for fabricating the composite casing.

Co-injection resin transfer molding methods are disclosed in U.S. Pat. No. 6,048,488, incorporated herein by reference, and may be used in fabricating the composite components of the present invention. Very briefly, two or more compositions are injected into separate portions of a mold and maintained as generally discrete layers during the molding process. FIG. 4 illustrates a cross-section of a mold 30 used in fabricating a tubular casing having three material layers. A plurality of slurry compositions 32, 34 and 36 are injected into the mold 30 through injection ports 38, 40 and 42 and passed through their respective mold portions 44, 46 and 48 around a mold core 50. A rotating mandrel assembly may be used as the mold core 50 with cylindrical or similarly shaped parts formed around a central axis. Various techniques may be employed to control the flow of the slurries and maintain the layers in separation. By way of example, preforms having different permeabilities can be placed in the mold portions 44, 46 and 48 prior to injection or separation layers can be disposed at the interfaces 52, 54 of the mold portions 44, 46 and 48. Preferably, the viscosity of the ceramic slurry should be similar to that of the epoxy for improved injection performance.

A co-injection process can be used in a mold design for simple panels and the like. A co-injection process also may be used with a rotating mandrel assembly similar to that used in traditional filament winding. Alternatively, a water-soluble mandrel material may be used in fabricating the composite parts to allow for easy separation of the part from the mold. This material provides a dimensionally stable preform for the composite component fabrication.

In other embodiments, the processes for fabricating composite components include steps for enhancing the aesthetics and surface finish of the composite components. For this purpose, for example, a small gap can be maintained between the fabric and the top of the mold so that the pure gelcasting slurry is infiltrated to provide a smooth surface finish.

EXAMPLES

The following examples are intended to illustrate the invention and not to limit or otherwise restrict the invention.

Example 1

Slurry Evaluation

The following $Si_3N_4$ slurries were evaluated:
(1) Ceramic slurry made from a premixed blend of UBE E-5 and E-10 $Si_3N_4$ powder, commercially available from UBE Industries, Tokyo, Japan, and ceria-based sintering aids (53 vol % solids loading);
(2) Ceramic slurry made from a premixed blend of UBE E-5 and E-10 $Si_3N_4$ powder and added ceria-based sintering aids (50 vol % solids loading);
(3) Ceramic slurry of UBE E-5 and E-10 $Si_3N_4$ powder and aluminum nitride and alumina and yttria sintering aids (52.18 vol % solids loading);
(4) Ceramic slurry made from Stark M-11 $Si_3N_4$ powder, commercially available from H. C. Starck Inc., Newton, Mass., and alumina and yttria sintering aids, commercially available from Malakoff Industries, Malakoff, Tex., and Molycorp Inc., Mountain Pass, Calif., respectively (52 vol % solids loading);
(5) Ceramic slurry made from Stark M-11 $Si_3N_4$ powder and alumina and yttria sintering aids (42 vol % solids loading); and
(6) Ceramic slurry made from a premixed blend of UBE E-5 and E-10 $Si_3N_4$ powder, commercially available from UBE Industries, Tokyo, Japan, and ceria-based sintering aids (49 vol % solids loading).

Figure 3:
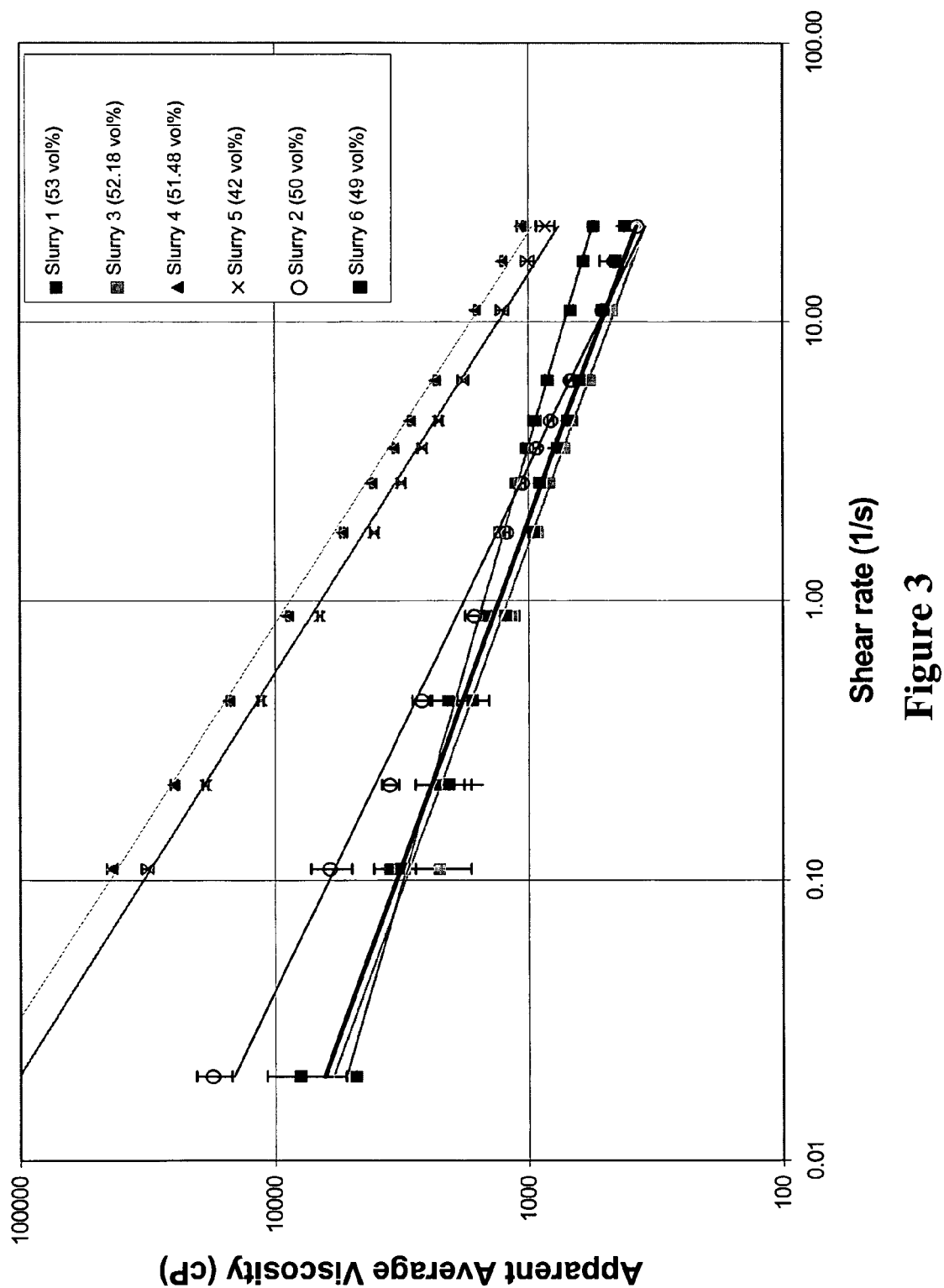
FIG. 3 is a graphical illustration of the average viscosities of various slurry compositions at different shear rates in accordance with the present invention.

The viscosity characteristics of all slurries were measured using a Brookfield Digital Rheometer, Model DV-III. The viscosities for the above-described formulations (1)–(6) ranged between about $10^5$ centipoise (cP) for shear rates lower than 0.05/second to about $10^2$–$10^3$ cP for shear rates of 10/second and higher. These results are illustrated in FIG. 3. Preferably, for effective co-injection and infusion, the viscosities of the resins and epoxies will range between about $10^2$ to about $10^3$ with a shear rate of 10/second.

Ceramic slurries having viscosities between about 100 to about 1000 cP are suited for co-injection with epoxies in a co-injection process such as CIRTM processes. By way of example, one such formulation (corresponding to slurry (6) above) is presented in Table 1.

TABLE 1

Typical Ceramic Slurry Formulation

| Constituent | Approx. vol % |
| --- | --- |
| Silicon nitride powder | 48–55% |
| Aluminum oxide | 1–3% |
| Yttrium oxide | 6–9% |
| Butrylactone | 10–30% |
| Hexanedioldiacrylate | 10–30% |
| Alkoxylated Aminoalcohol | 1–5% |
| Organophosphate Ester surfactants | 0–5% |

Another formulation containing AlN and $Al_2O_3$ (corresponding to slurry (3) above) was also found to have the required viscosity for co-injection processes, as shown in FIG. 3. The ceramic slurry ingredients include $Al_2O_3$ and $Y_2O_3$ as sintering additives for providing the silicon nitride with sinterability, along with the non-solid components hexanedioldiacrylate (HODA), commercially available from Aldrich Chemical Company, Milwaukee, Wis., liquid ester and butrylactone (BLO), commercially available from Aldrich Chemical Company, Milwaukee, Wis., as the vehicles for the ceramic slurry. The aminoalcohol (Zephrym™ MPD-7000 commercially available from ICI Specialty Chemicals, Wilmington, Del.) and organophosphate ester (MAPHOS™ 8135 commercially available from BASF Corporation, Folcroft, Pa.) are the dispersants for the powders. This ceramic slurry composition is suitable for radar absorption for use as ceramic radomes based on the dielectric constant and loss tangent of the composition.

Example 2

CITRM of Composite Panels with Integral Heat Shields

Composite panels were fabricated using a CIRTM process. Epoxy resin and silicon nitride ceramic slurry were co-injected into a two-dimensional, 50% by volume porous fiber preforms to produce integral composite panels. A polysulfone layer was included as an intermediate layer for the epoxy resin and ceramic slurry to diffuse into and create a strong bond between the two layers after final curing. A 24-oz. S2 glass fabric was used as the preform. Initial co-injection tests were used to evaluate slurry rheology and whether the slurries were capable of being effectively co-injected with the polymer composite resins.

Once the co-injection process was complete, the composite panels were allowed to self-cure for several hours during the exothermic portion of the curing cycle. To accelerate the final stages of the endothermic curing cycle, the panels were placed in a 350° F. oven for 2 hours. The following 6"×6" panels were produced: a 1-layer panel comprised of glass fiber reinforced silicon nitride, a 2-layer panel comprised of glass fiber reinforced silicon nitride and carbon fiber reinforced epoxy, and a 3-layer panel comprised of a middle epoxy-carbon fiber layer with silicon nitride-glass fiber layers on the top and bottom.

Both the epoxy and ceramic slurry fully infiltrated the fiber preforms and were completely cured. The adjacent material layers also appear to be well fused along the entire interface. The feasibility of using a CIRTM process to fabricate polymer composite components with integral heat shield layers was successfully demonstrated.

Many modifications and variations may be made in the techniques and compositions described and illustrated herein without departing from the spirit and scope of the present invention. Accordingly, the techniques and compositions described and illustrated herein should be understood to be illustrative only and not limiting upon the scope of the present invention.

What is claimed is:

1. A co-cured non-metallic composite part for use in environments having elevated temperatures comprising a plurality of layers of non-metallic materials, said layers including:
   a first layer of a first non-metallic substrate material for providing structural support for the composite part; and
   a second layer of a second non-metallic material overlaying the first layer, said second material characterized by limiting the effects of heat on the first layer, the second material formed from a ceramic composition, the second material having a porosity of at least about 20 percent by volume;
   the co-cured composite part having no metallic substrate and having improved bonding of the first and second layers and reduced occurrence of delamination of the first and second layers as compared to a composite part of mechanically joined layers.

2. The composite part of claim 1 wherein the first material is a polymer composite composition.

3. The composite part of claim 2 wherein the polymer composite composition is selected from the group consisting of fiberglass, vinyl ester, epoxy and mixtures thereof.

4. The composite part of claim 2 wherein the first material includes a reinforcement material.

5. The composite part of claim 1 wherein the ceramic composition has a thermal conductivity of no more than about 10 W/mK.

6. The composite part of claim 1 wherein both the first and the second materials are a ceramic composition.

7. The composite part of claim 1, wherein the composite put includes a separation layer between the first and second layer for maintaining the first layer in generally spaced relation with the second layer during fabrication.

8. The composite part of claim 1 wherein the second material includes internal pores having diameters between about 50 to about 100 $\mu$m.

9. The composite part of claim 1 wherein the second layer is of a material and having a thickness effective for protecting the composite part from the effects of temperatures of at least about 1200° C.

10. The composite part of claim 7 wherein the separation layer is compatible with but generally permeable to the first and second materials to allow chemical and mechanical bonding of the materials.

11. The composite part of claim 10, wherein the separation layer includes a thermoplastic film, a thermoset film adhesive and combinations thereof.

12. The composite part of claim 1 further comprising a third non-metallic layer, wherein the second layer is adjacent one surface of the first layer and the third layer is adjacent a surface of the first layer opposite the one surface and wherein the third layer limits the effects of heat on the first layer.

13. The composite part of claim 1 wherein the second material has a porosity of between about 20 to about 60 percent by volume.

14. A non-metallic missile system component part comprising a non-metallic structural support layer and one or more non-metallic heat insulating layers formed from one or more ceramic compositions having a porosity of at least about 20 percent by volume and adjacent one or more outer surfaces of the structural support layer, wherein the component part does not include a metallic substrate and wherein the layers of the component part are integrally fabricated to provide improved bonding and limit delamination of the layers as compared to a component part having layers that are mechanically secured.

15. The component part of claim 14 wherein the structural support layer is a polymer composition.

16. The component part of claim 15 wherein the polymer composition includes a reinforcement material.

17. The component part of claim 14 wherein the ceramic composition includes a reinforcement material and has a porosity of between about 20 to about 50 percent.

18. The component part of claim 14 wherein the structural support layer is a ceramic composition.

19. The component part of claim 18 wherein the ceramic composition includes a reinforcement material.

20. The component part of claim 14 wherein the ceramic composition has a dielectric constant effective for radar absorption.

* * * * *